(12) United States Patent
Ingraham

(10) Patent No.: US 10,888,081 B2
(45) Date of Patent: Jan. 12, 2021

(54) HORSESHOE WITH CUFF COUPLING AND METHODS OF USING SAME

(71) Applicant: Challen Ingraham, Tabernacle, NJ (US)

(72) Inventor: Challen Ingraham, Tabernacle, NJ (US)

( * ) Notice: Subject to any disclaimer, the term of this patent is extended or adjusted under 35 U.S.C. 154(b) by 134 days.

(21) Appl. No.: 16/367,490

(22) Filed: Mar. 28, 2019

(65) Prior Publication Data
US 2020/0305405 A1    Oct. 1, 2020

(51) Int. Cl.
*A01L 3/00*    (2006.01)
*A01L 5/00*    (2006.01)

(52) U.S. Cl.
CPC .. *A01L 3/00* (2013.01); *A01L 5/00* (2013.01)

(58) Field of Classification Search
CPC ................. A01L 3/04; A01L 3/00; A01L 5/00
See application file for complete search history.

(56) References Cited

U.S. PATENT DOCUMENTS

| | | | | |
|---|---|---|---|---|
| 53,930 | A * | 4/1866 | Werner | A01L 3/04 168/21 |
| 142,282 | A * | 8/1873 | Rowe et al. | A01L 3/04 168/19 |
| 1,428,167 | A * | 9/1922 | Herger | A01L 3/04 168/19 |
| 4,580,637 | A | 4/1986 | King | |
| 5,168,934 | A | 12/1992 | Nebel et al. | |
| 5,230,384 | A | 7/1993 | Nebel et al. | |
| 6,082,462 | A | 7/2000 | Lyden | |
| 6,443,232 | B1 | 9/2002 | Møller et al. | |
| 6,497,293 | B1 | 12/2002 | Miller | |
| 2004/0031616 | A1 | 2/2004 | Moller et al. | |
| 2007/0068682 | A1 | 3/2007 | McKinlay | |
| 2009/0044511 | A1 | 2/2009 | Brisson | |
| 2011/0278025 | A1 | 11/2011 | Hamilton | |
| 2014/0231100 | A1* | 8/2014 | Ford | A01L 1/02 168/12 |
| 2014/0262353 | A1 | 9/2014 | Bergeleen et al. | |
| 2015/0238344 | A1 | 8/2015 | Nylund | |
| 2015/0245602 | A1 | 9/2015 | Nylund | |
| 2015/0366181 | A1 | 12/2015 | Koenig et al. | |
| 2016/0192634 | A1 | 7/2016 | Basic | |

(Continued)

FOREIGN PATENT DOCUMENTS

EP    1060666 A3    5/2001

*Primary Examiner* — Daniel J Colilla
(74) *Attorney, Agent, or Firm* — Wei & Sleman LLP

(57) ABSTRACT

A horseshoe having a front end and a back end includes a U-shaped rigid body having an upper surface and a lower surface, the rigid body being closed adjacent the front end and open adjacent the back end, the rigid body defining two arms spaced from one another at the back end, a pair of cuffs disposed on the upper surface of the rigid body, each of the pair of cuffs having an inner surface configured and arranged to contact a hoof of an animal, and an outer surface opposite the inner surface, each of the pair of cuffs being coupled to a respective one of the two arms of the rigid body adjacent the back end, a pair of side supports coupled to the outer surface of each of the pair of cuffs, each of the pair of side supports defining a window, and a platform disposed on the upper surface of the rigid body at locations where the pair of cuffs are not present.

16 Claims, 5 Drawing Sheets

(56) References Cited

U.S. PATENT DOCUMENTS

2017/0071183 A1  3/2017  Bergeleen et al.
2017/0258066 A1  9/2017  Stevenson et al.
2018/0139945 A1  5/2018  Revheim et al.

* cited by examiner

HORSESHOE WITH CUFF COUPLING AND METHODS OF USING SAME

FIELD OF THE DISCLOSURE

The present disclosure relates to devices and methods for providing support for hoofed animals. More particularly the present disclosure relates to horseshoes having coupling and support features.

BACKGROUND OF THE DISCLOSURE

Conventional horseshoes are constructed of steel, iron or aluminum and are fastened to the underside of a hoof by nails. Such horseshoes have a U-shaped configuration to permit the natural outward movement of the outer side wall of an animal's hoof upon impact with a surface. The spreading is a result of the elastic characteristics of a hoof and is most pronounced at the rear, or heel, of a hoof. This spreading is important to prevention of injuries.

Horseshoes are typically secured to a hoof by the driving of nails into the horn wall of the hoof, known as the keratinous portion of the hoof. Great care must be taken in directing the nail into the keratinous portion so as to prevent injury to the animal. The nails are driven in a direction at an angle away from the center of the hoof, with any nail points extending from the outer side wall of the hoof being cut off or hammered against the hoof. Errors made in driving the nails or in hammering nail points may lame an animal.

Securely fixing a horseshoe to the hoof of horse may be difficult. For example, it may be difficult to drive nails at certain portions of the hoof. Additionally, other methods of securing a horseshoe to a hoof may not perform as well as nailing.

SUMMARY OF THE DISCLOSURE

In some embodiments, a horseshoe having a front end and a back end includes a U-shaped rigid body having an upper surface and a lower surface, the rigid body being closed adjacent the front end and open adjacent the back end, the rigid body defining two arms spaced from one another at the back end, a pair of cuffs disposed on the upper surface of the rigid body, each of the pair of cuffs having an inner surface configured and arranged to contact a hoof of an animal, and an outer surface opposite the inner surface, each of the pair of cuffs being coupled to a respective one of the two arms of the rigid body adjacent the back end, a pair of side supports coupled to the outer surface of each of the pair of cuffs, each of the pair of side supports defining a window, and a platform disposed on the upper surface of the rigid body at locations where the pair of cuffs are not present.

BRIEF DESCRIPTION OF THE DISCLOSURE

Various embodiments of the presently disclosed horseshoes are shown herein with reference to the drawings, wherein.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to horseshoes and their methods of use, conventional devices suffer from some shortcomings as described above.

There therefore is a need for further improvements to the devices, systems, and methods of providing support to hoofed animals. Among other advantages, the present disclosure may address one or more of these needs. As used herein, the term "front" will refer to a location or direction closer to an animal's toe and the term "back" will refer to a location or direction closer to the animal's heel. "Top" refers to a structure closer to the hoof of an animal, while "bottom" refers to a structure farther from the animal's hoof.

Figure 1:
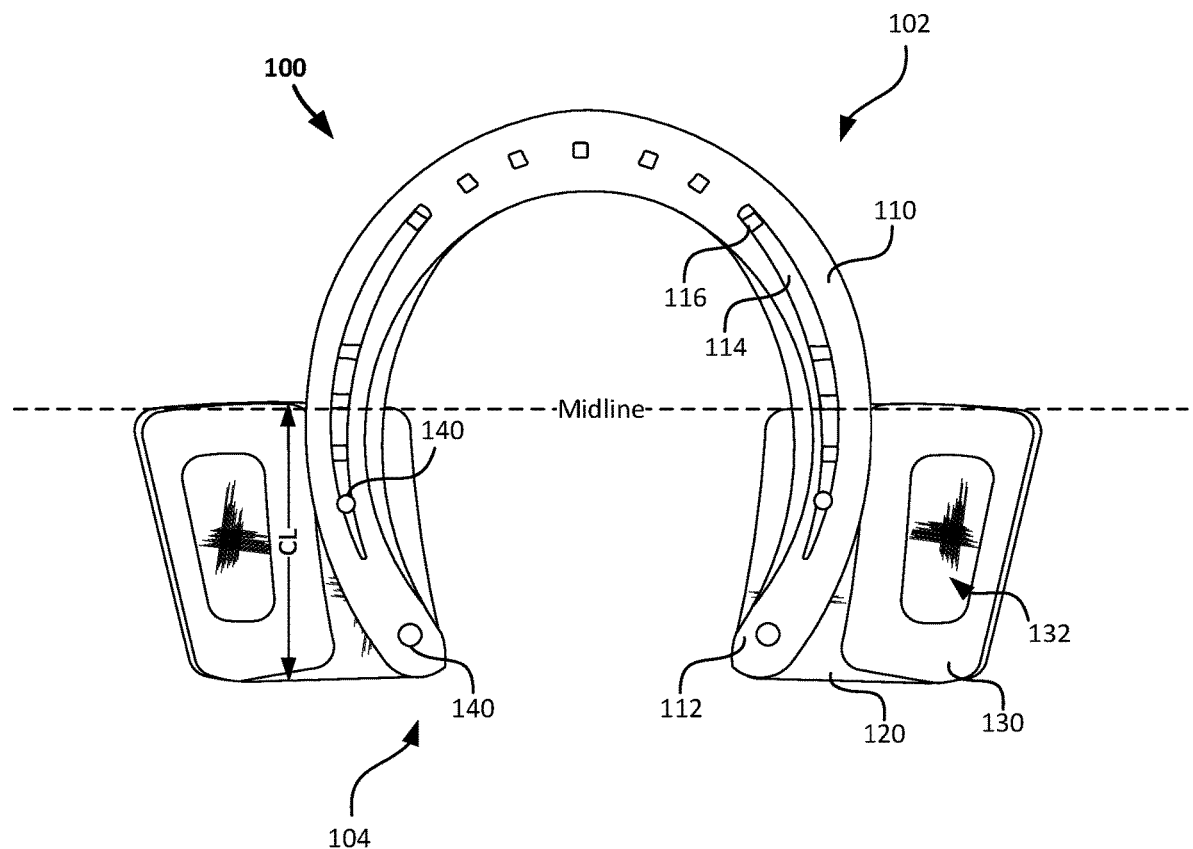
FIG. 1 is a schematic bottom view of one example of a horseshoe according to the present disclosure.

Horseshoe 100 includes several components coupled together, which will be appreciated from examining the several views of the horseshoe in FIGS. 1-7. FIG. 1 illustrates a horseshoe 100 having a generally U-shaped rigid body 110 that includes a pair of branches or arms 112 connected or closed adjacent the front end 102 (i.e., adjacent the horse's toe), and open or spaced from one another adjacent the back end 104 (i.e., adjacent the horse's heel). Body 110 may be formed of a metal such as steel, aluminum or iron, or any other suitable material having the desired stiffness to support the animal's weight. Body 110 may include a pair of curved slots 114, each slot being disposed on an arm 112, the slots having a plurality of apertures 116 configured and arranged to accept a nail therethrough for coupling the horseshoe to the hoof.

Figure 8:
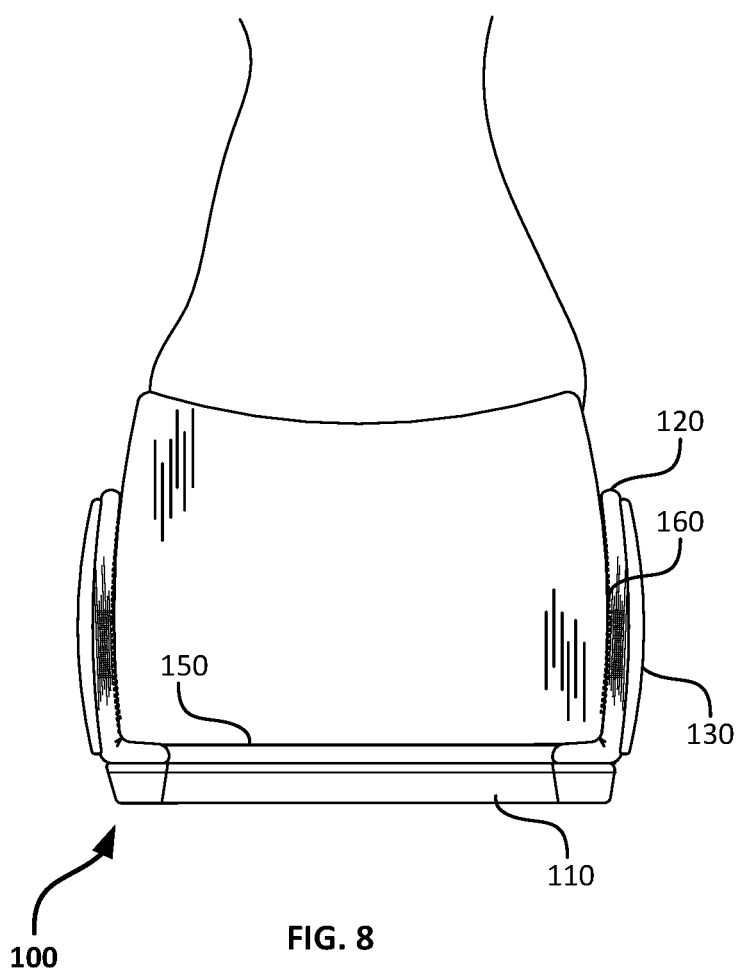
FIG. 8 is a schematic back view of the horseshoe of FIG. 1 being attached to a hoof.

Each arm 112 may be coupled to a cuff 120. Cuff 120 may be formed of a fabric, such as a woven nylon fabric (or nylon webbing) or other suitable material. In some examples, the nylon material is reusable as it allows for mechanical adherence of an epoxy or other material, but does not allow impregnation of the adhesive material in the nylon material. The material of cuff 120 may be selected to be durable and to have a surface capable of being securely coupled to the hoof of an animal using an epoxy or other suitable adhesives. Ends of the cuff may be doubled over and/or hemmed to prevent fraying. Each cuff 120 may have a quadrilateral, trapezoidal or other similar shape. Cuff 120 may have a cuff length "CL" of between 2 and 3 inches, and cuff width "CW" of between 3 and 5 inches to allow it to fold up and be disposed over a portion of a hoof as seen in FIG. 8. Cuffs 120 may be securely coupled to arms 112 of the body 110 via pins 140 or other fasteners. As shown, cuffs 120 cover a portion of each arm. In at least some examples, cuffs are disposed toward the back end 104 and arranged to fasten the horseshoe near the heel. For example, when nailing a horseshoe, it may be easier to drive nails through the front of the hoof than to do so near the heel at the quarters of the hoof because of thinning in the hoof wall where driving nails may cause injury or be less prone to falling out. For this reason, a cuff may be used to fasten the horseshoe near the heel region adjacent the quarters, and nails may be used to fasten the horseshoe near the toe region.

A pair of side supports 130 may be coupled to the cuffs 120 via, for example, adhesive. Each side support 130 may be generally rectangular and/or may follow the general shape of the cuff. Each side support 130 may also have a window 132 through which the cuff is visible. Window 132 may provide increased flexibility and/or breathability to the side support 130. In some examples, each side support 130 may be formed of acrylonitrile butadiene styrene (ABS) or similar polymers, rubber, or any other suitable material. In at least some examples, the side supports 130 may be formed of polyester that is stitched, or otherwise attached to cuffs 120, the side supports optionally having the windows as discussed above.

Figure 2:
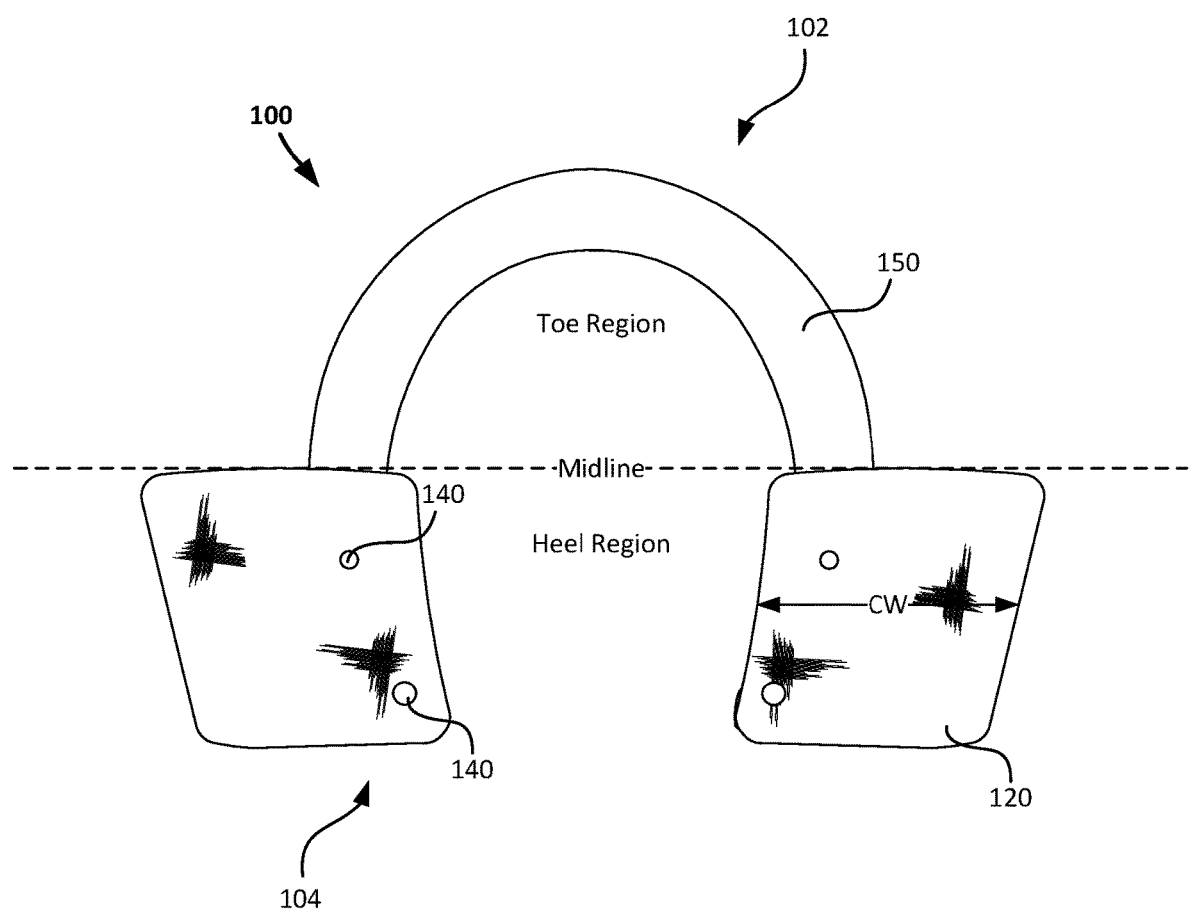
FIG. 2 is a schematic top view of the horseshoe of FIG. 1.
Figure 3:
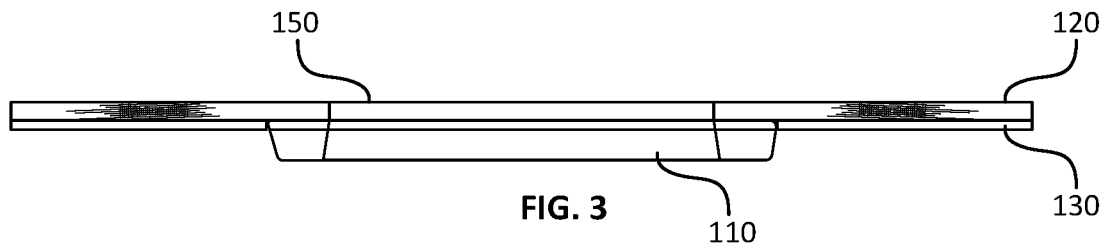
FIGS. 3-7 are schematic back, front, right side, left side, and perspective views of the horseshoe of FIG. 1.
Figure 4:
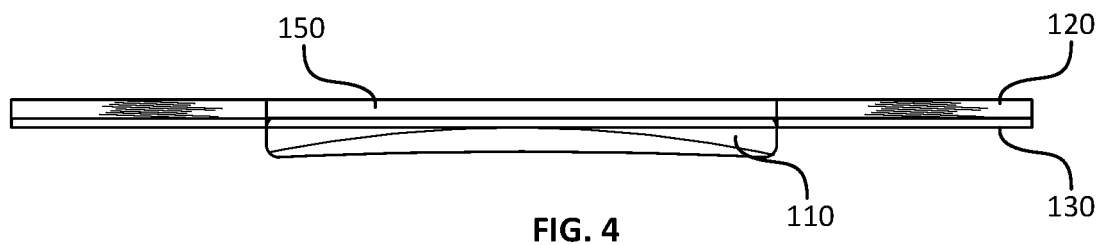
Figure 5:
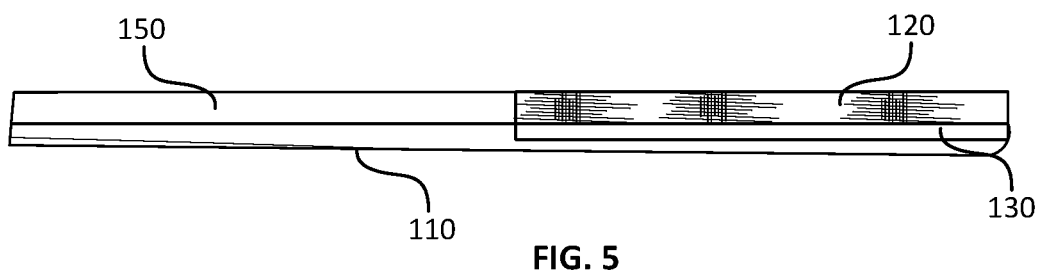
Figure 6:
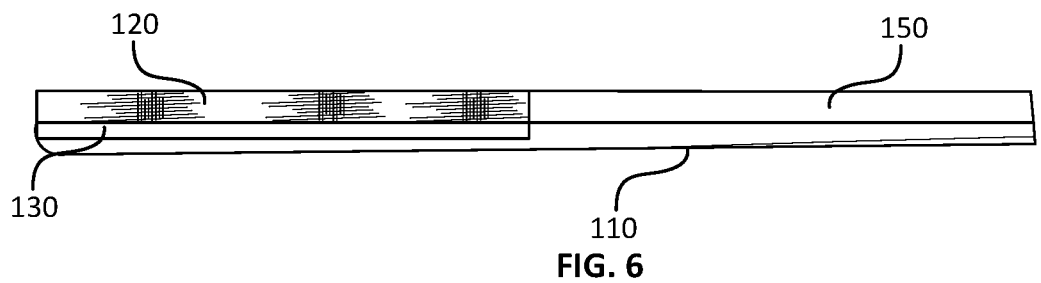
Figure 7:
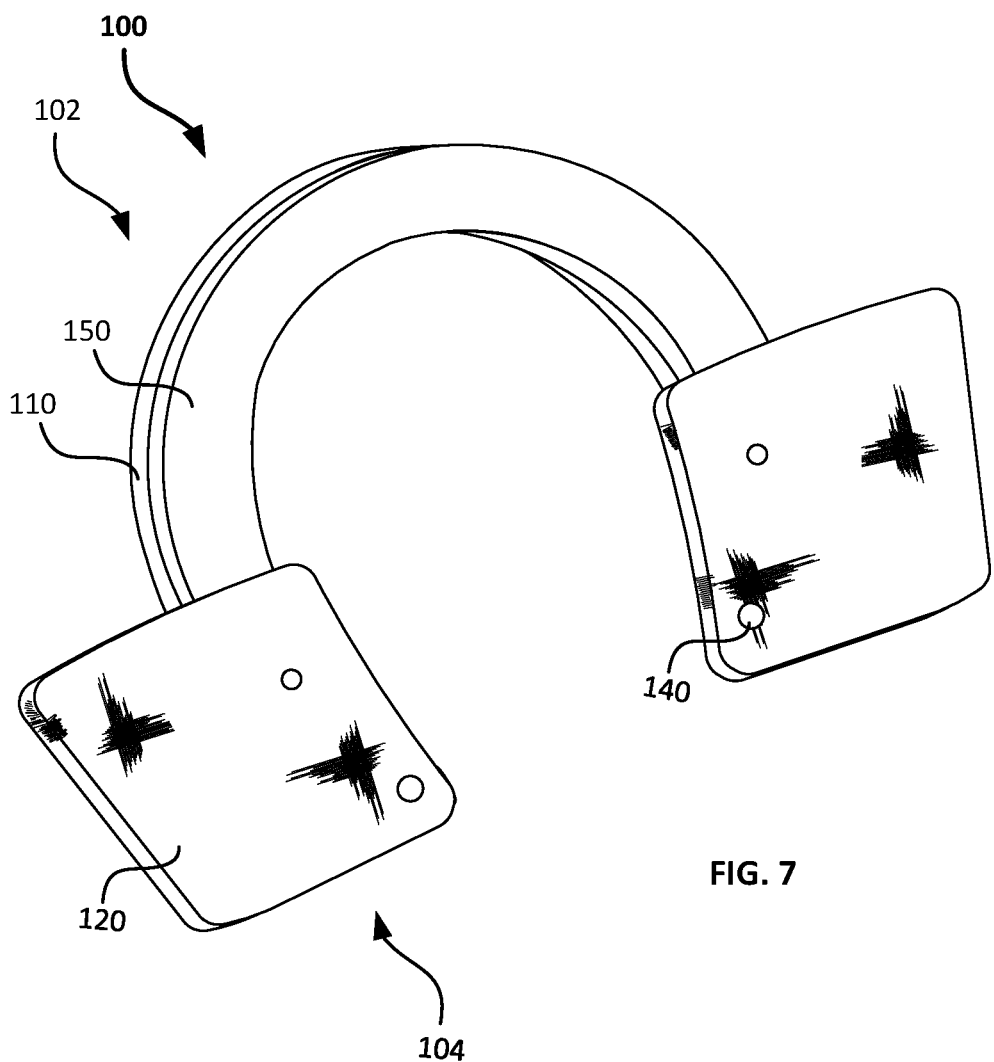

Turning to the top view of FIG. 2, a U-shaped toe platform 150 is also provided and coupled to body 110. Toe platform 150 may be adhered to body 110 or coupled using any other suitable method. Platform 150 may be tailored to match the middle portion of the body 110 and to have the same curvature and width. Platform 150 may be disposed on all areas of the body that are not covered by cuffs 120. Thus, the entire upper surface (i.e., the surface in contact with a hoof) of body 110 may be covered by either the toe platform 150 or one of the cuffs. In at least some examples, the sizes and/or locations of the cuff 120 may be changed, and toe platform 150 may cover any portion of the body that is not covered by the cuff 120. Additionally, toe platform 150 may have a same thickness as the cuffs 120 so that the three components (i.e., the platform and two cuffs) form a level surface and the hoof contacts both the platform and the cuffs evenly. Alternatively, in some examples toe platform 150 may be slightly thinner than the cuffs, and the fabric of the cuff may be more compressible than the platform so that when a horse's weigh is applied to both, a level surface is formed. In at least some examples, toe platform may be formed of the same material as side supports 130. For example, platform 150 may be formed of acrylonitrile butadiene styrene (ABS) or other similar polymer, or any other suitable material. Alternatively, platform may be formed of any suitable cushioned, shock-absorbing material as it will contact the bottom of the horse's hoof.

As shown in FIG. 2, in some examples, the horseshoe may be generally divided by a midline that divides the perimeter of the horseshoe into thirds—one third for each of the cuffs, and a third for the platform. The region above the midline may be referred to as the "toe region" and the region below the midline may be referred to as the "heel region". In one example, the horseshoe includes cuffs at the heel region and a platform at the toe region so that the horseshoe is coupled to a hoof via nails at the toe region and via the cuffs and epoxy at the heel region.

In use, as shown in FIG. 1, the horseshoe 100 may be placed on a hoof, and the body 110 may be nailed along the perimeter at various locations to the hoof. The hoof will contact the toe platform 150 and sit on a portion of each of the two cuffs 120. The cuffs 120 may be turned upward and adhered to the sides of the hoof via an adhesive 160, the side supports 130 providing additional wall strength to the cuffs, and the windows in the side supports 130 permitting a degree of flexibility. In at least some examples, the toe region of the hoof will be attached via nails, while the heel region of the hoof will be attached via cuffs, or a combination of nails and cuffs.

Although the invention herein has been described with reference to particular embodiments, it is be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A horseshoe having a front end and a back end comprising:
   a U-shaped rigid body having an upper surface and a lower surface, the rigid body being closed adjacent the front end and open adjacent the back end, the rigid body defining two arms spaced from one another at the back end;
   a pair of cuffs disposed on the upper surface of the rigid body, each of the pair of cuffs having an inner surface configured and arranged to contact a hoof of an animal, and an outer surface opposite the inner surface, each of the pair of cuffs being coupled to a respective one of the two arms of the rigid body adjacent the back end;
   a pair of side supports wherein each of the pair of side supports is coupled to the outer surface of a respective one of the pair of cuffs, each of the pair of side supports defining a window; and
   a platform disposed on the upper surface of the rigid body at locations where the pair of cuffs are not present.

2. The horseshoe of claim 1, wherein the platform and the pair of side supports comprise different materials.

3. The horseshoe of claim 2, wherein the platform comprises rubber and the pair of side supports comprise polyester.

4. The horseshoe of claim 1, wherein the platform is disposed adjacent the front end.

5. The horseshoe of claim 1, wherein the platform and the pair of cuffs do not overlap.

6. The horseshoe of claim 1, wherein the platform and the pair of cuffs collectively cover an entirety of the upper surface of the rigid body.

7. The horseshoe of claim 1, wherein the platform is disposed only within a toe region of the horseshoe.

8. The horseshoe of claim 1, wherein the pairs of cuffs are disposed only within a heel region of the horseshoe.

9. The horseshoe of claim 1, wherein the pair of cuffs are made of a fabric.

10. The horseshoe of claim 9, further comprising an epoxy disposed on the fabric and configured to couple the fabric to an animal's hoof.

11. The horseshoe of claim 1, further comprising at least one nail passing through both the platform and the rigid body.

12. The horseshoe of claim 1, further comprising a plurality of nails disposed only within a toe region of the horseshoe.

13. A method of supporting a horse's hoof comprising:
   providing a horseshoe having a front end and a back end, the horseshoe including (a) a U-shaped rigid body having an upper surface and a lower surface, the rigid body being closed adjacent the front end and open adjacent the back end, the rigid body defining two arms spaced from one another at the back end, (b) a pair of cuffs disposed on the upper surface of the rigid body, each of the pair of cuffs having an inner surface configured and arranged to contact a hoof of an animal, and an outer surface opposite the inner surface, each of the pair of cuffs being coupled to a respective one of the two arms of the rigid body adjacent the back end, (c) a pair of side supports wherein each of the pair of side supports is coupled to the outer surface of a respective one of the pair of cuffs, each of the pair of side supports defining a window, and (d) a platform disposed on the upper surface of the rigid body at locations where the pair of cuffs are not present;

coupling the horseshoe to a hoof adjacent the front end with at least one nail; and coupling the pair of cuffs of the horseshoe to the hoof adjacent the back end via epoxy.

14. The method of claim 13, wherein coupling the horseshoe to a hoof adjacent the front end with at least one nail comprises driving at least one nail through both the rigid body and the platform.

15. The method of claim 14, wherein driving at least one nail through both the rigid body and the platform comprises driving a plurality of nails through both the rigid body and the platform within only a toe region of the horseshoe.

16. The method of claim 13, wherein coupling the pair of cuffs of the horseshoe to the hoof adjacent the back end via epoxy includes folding up each of the pair of cuffs so that they form a wall parallel with a side of a hoof.

* * * * *